United States Patent [19]

Finley

[11] 4,383,555
[45] May 17, 1983

[54] HELICALLY WOUND HOSE FROM CO-EXTRUDED PROFILE WITH REINFORCING RIBS INTERLOCKED AT ADJACENT CONVOLUTIONS

[75] Inventor: Richard O. Finley, Redondo Beach, Calif.

[73] Assignee: Plastiflex Company International, Fountain Valley, Calif.

[21] Appl. No.: 678,547

[22] Filed: Apr. 20, 1976

[51] Int. Cl.³ .............................................. F16L 11/08
[52] U.S. Cl. ................................... 138/129; 138/122; 138/154; 428/192; 156/143
[58] Field of Search ............... 138/121, 122, 129, 154, 138/173, 177; 428/192; 156/143, 195, 244

[56] References Cited

U.S. PATENT DOCUMENTS

| | | | |
|---|---|---|---|
| 2,713,381 | 7/1955 | Seck | 138/122 X |
| 2,731,040 | 1/1956 | Warburton | 138/129 |
| 2,739,089 | 3/1956 | Hageltorn | 138/129 X |
| 2,901,024 | 8/1959 | Marsden | 138/122 X |
| 3,184,358 | 5/1965 | Utz | 156/244 |
| 3,199,541 | 8/1965 | Richitelli | 138/129 |
| 3,248,272 | 4/1966 | Sawada | 138/125 X |
| 3,255,780 | 6/1966 | Squirrell | 138/122 |
| 3,297,055 | 1/1967 | Beck | 138/129 X |
| 3,765,329 | 10/1973 | Kirkpatrick et al. | 428/192 |
| 3,890,181 | 6/1975 | Stent et al. | 138/129 X |
| 3,910,808 | 10/1975 | Steward | 156/429 |

FOREIGN PATENT DOCUMENTS 641090 8/1950 United Kingdom ................ 138/129
789521 1/1958 United Kingdom ................ 138/129

Primary Examiner—James E. Bryant, III
Attorney, Agent, or Firm—Lewis B. Sternfels

[57] ABSTRACT

A flexible hose having resistance to radial crush is formed from a bonded and interlocked helically wound rod or strip of plastic co-extrusion. The co-extruded profile of the strip is defined by a pair of matable rib components which are joined by a web. The rib components are bonded, sealed and interlocked together at adjoining convolutions of the profile not only to form the hose but also to form a composite rib integrated into the hose for resisting radial crushing and axially directed deformation forces exerted on the hose. The composite rib is formed from a material having a hardness which is greater than that of at least a part of the web for rendering the rib with a relatively stiff bend resistance characteristic and the web with a relatively soft and flexible characteristic. The web itself may be a co-extrusion of two materials placed in series, or in parallel as a laminate, or a combination thereof. If a laminate, one of its materials may be the same as that of the rib but much thinner so as to provide a larger surface area for greater bonding or adhesion among the several parts of the extruded profile. Different materials, especially in a laminate, enable the hose to be tailored for specific uses and environments which come into contact with either or both the inside and outside of the hose.

36 Claims, 13 Drawing Figures

HELICALLY WOUND HOSE FROM CO-EXTRUDED PROFILE WITH REINFORCING RIBS INTERLOCKED AT ADJACENT CONVOLUTIONS

BACKGROUND OF THE INVENTION

1. Field Of The Invention

The present invention relates to a flexible hose formed from a helically wound co-extruded strip having a reinforcing and interlocking rib of hardness generally greater and less flexible than its web connection.

2. Description Of The Prior Art And Background Considerations

While the present invention was originally conceived as being an all-plastic equivalent of solid or stranded wire-reinforced vinyl hose, it is to be understood that this original concept is adaptable to the general class of flexible hoses. Nevertheless, to provide a background to the present invention, it will be useful to discuss some aspects of its development.

As is well known in the art, a wire-reinforced vinyl hose comprises in general a hard rib of wire, with or without a plastic casing, which is surrounded by or connected to a relatively thin and/or flexible web. Such a hose is, by one conventional method, fabricated by winding the wire about a supporting mandrel, over which the web is placed such as by a shrink-fit, wrapping or a combination thereof. While such a construction forms a flexible and durable hose, certain drawbacks result therefrom. First, it is not possible to fabricate such a hose in continuously extended lengths because a mandrel is required for supporting the wire about which the web is placed. Thus, one limitation primarily relates to the length to which a mandrel can reasonably be made. Of course, mandrels can be made to any desired length, so long as there is proper space and support for the mandrel; however, the problem is one of reasonableness. The second limitation is one of cost. Wire has become very expensive and, as a result, such a hose becomes less competitive with other hoses. Secondary cost limitations are the requirement for two or three components comprising the wire, whether bare or plastic covered, and the web which must be placed thereover. A further cost is the increase in handling fabrication which is required.

Several efforts have been made to overcome the above problems as illustrated, for example, in U.S. Pat. Nos. 3,890,181 and 3,910,808. In the former patent, a strip of first plastic material is extruded along with a reinforcing element of a second plastic material. The strip is wound into a helix around a driven mandrel and bonded at adjacent turns together by pressure and heat or solvent. At the same time, the reinforcing element is wound about the helix of the first plastic material in spaced apart helical turns impressed into and partially embedded within the strip. While such a process is stated to permit the use of different plastic materials for achieving any desired hose characteristics, one difficulty is the ability to maintain definite and advantageous shapes, leading to distortion, as a result of assembly of the hose during the semi-molten condition of its component materials.

U.S. Pat. No. 3,910,808 describes a plastic strip having a longitudinal rib in which one edge of each convolution overlaps and is heat bonded to an edge of a preceding convolution, with the rib being on the exterior of the thus-formed tube. Since such a hose is formed of a single material, its rib strength is derived from the mass of material necessary to obtain the desired resistance to radial crush. Accordingly, one major problem is the cost resulting from the mass of material needed for the rib. It also is subject to similar assembly distortion problems as with the previously described hose.

In view of the above problems with the prior art, a different approach involved use of the profile shown in U.S. Pat. No. 3,255,780 in which its axially extending base planar leg was lengthened so as to obtain a configuration generally having the appearance of hose 11 shown herein in FIG. 1 of the attached drawings. In contradistinction to utilizing the flexibility of the loops required by U.S. Pat. No. 3,255,780, loops 12 of FIG. 1 were completely filled with bonding material 14 about both sides of inner radial leg 16 so as to form a helically extending solid and heavy rib 18. This heavy rib mass gave good resistance to radial crush exerted on hose 11 while elongated axially-extending base planar leg 19 was capable of flexing or bending to impart the entire hose with flexibility. Such a hose was in fact sold in 1973 (thus, it is acknowledged as prior art as having been "on sale" for more than one year prior to the filing hereof); however, because of cost problems due to the use of the relative large amount of plastic material required, it was not sufficiently competitive in the market.

Further prior art of interest, U.S. Pat. No. 3,199,541 describes a flexible hose which is formed from a helically arranged elongated strip in which adjacent convolutions are interlocked by opposed mating male and female connecting elements on the strip. At least one of the male and female connecting elements is said to have a composite structural formation defined in part by the strip and in part by a resinous plastic material substantially stiffer than the strip material. The resinous plastic material is said to contribute to the crush resistance of the hose. Flexibility, however, is obtained from a radially extending leg using the same flexible loop concept described in above-mentioned U.S. Pat. No. 3,255,780.

Other prior art of interest herein includes a heavy section hose which the Assignee (Plastiflex Co.) hereof has sold for more than one year prior to the filing hereof under the trademark "Hi-Vac", which is an all plastic hose formed from two components. One component comprises an extruded thick and heavy web section of general W-shape with a bellow which imparts flexibility to the hose. Radially outwardly extending legs abut at adjacent convolutions of the W-shaped web section and are joined together by a U-shaped heavy rib which is bonded to the radial legs, and the radial legs themselves are bonded to one another. The radial legs are required in part for bonding purposes and for imparting resistance to radial crush, and in part for holding and handling of the web section during formation of the hose, without which the web section could not be readily convoluted. The web section is of generally softer material than the rib, which has a greater hardness to enhance the abrasion resistance and the hoop strength of the hose. Notwithstanding the softness of the web section, the bellow centrally formed therein is required to impart flexibility to the hose.

Since published material such as advertising sheets describing the "Hi-Vac" suction hose may not be generally available, copies are filed concurrently herewith and made a part of the file wrapper hereof. In addition, for convenience, copies of the above-identified patents are also filed herewith.

While such "Hi-Vac" hose functions very well for its intended purpose, its purpose is primarily for resisting radial crush forces exerted when internal pressures of the hose are reduced below that of atmosphere, i.e., partial or complete vacuum, and for heavy duty industrial use where, for example, it is required to resist the weight of trucks and trailers and to convey heavy sludge. One general limitation is similar to those described above in that the bonding of the two radial legs together as well as the rib bonded thereto produces a very heavy and massive rib and a hose of large external diameter as compared to its internal diameter. The result precludes the obtaining of a smaller outer to inner diameter. Another limitation of the hose is the requirement that its radially extending legs are needed for assembly of its components.

As a result of the above problems, it was necessary to investigate new approaches, from which the present invention arose.

SUMMARY OF THE INVENTION

Accordingly, the present invention comprises a co-extruded profile defined by a flexible web having a pair of relatively rigid rib components extending along the opposite margins of the web. Both rib components have a higher hardness than that of the web so that, when the rib components are bonded and sealed together at adjacent convolutions to form a helically wound hose, the rib components form a rib having a relatively stiff and crush resistant characteristic with respect to that of the web which, as a result of its relative softness, imparts flexibility to the helically wound hose. Flexibility of the web is additionally attained by making it as thin as possible.

The rib components may be of several shapes but preferably comprise a matable or interlocking physical construction so as to enable and maximize bonding therebetween at adjacent convolutions as well as to facilitate retention of bonding materials during assembly of the strip into a hose. The web also may be of a single material or a co-extrusion of two or more materials placed in series, or in parallel as a laminate, or combinations thereof. In one embodiment, in order to maximize surface contact and bonding between the web material and the rib component material, the web is formed as a laminate in which one part of the laminate comprises a material which is the same as that of the rib components, albeit having a much thinner thickness, even as compared to the remainder of the web.

The strip comprising a web joining one or more rib components comprises a co-extrusion of materials, which insures success of the novel construction. In the co-extrusion, it is preferred that the bonding of the component materials occurs in the same extruder die and prior to exit of the streams of the materials from the die thereby producing an integral extruded profile.

For purposes of definition, the mechanisms for co-extrusion include devices that combine the material streams before they exit the die as well as devices that perform the marriage outside it. While both types of co-extrusion are useful to form the strip of the present invention, it is preferred that the co-extrusion formed depends on material union before leaving the die.

It is also preferred, for maintaining the defined shapes of the co-extruded profiles and commensurate with a minimum quantity of material for maximum hose strength, that the profiles first be extruded and cooled to fix the defined profile before being formed into the hose. In this regard, the rib components function additionally to facilitate handling of the strip when wound into the hose, to interlock the wound strip together, and to ensure proper location of the bonding material.

It is, therefore, an object of the present invention to provide for a novel co-extruded strip having portions of different hardness is order to form, when helically wound into tubular configuration and bonded, a flexible hose having relatively stiff ribs capable of withstanding radially directed crush forces exerted on the hose.

Another object is to provide for a composite co-extruded profile of such a strip, which is shaped precisely, has great flexibility, is easily convoluted into a helically wound hose, and is precisely bonded together.

Another object is to provide for a flexible hose formed from such a strip which is lower in cost, compared to available hoses of the same general type.

Another object is to provide for such a hose formed from a strip of co-extruded profile whose material components are such as to maximize rigidity, flexibility and specific environmental uses of the hose.

Another object is to provide for such a hose which is tailored in its materials to specific uses and environments.

Another object of such a hose is to provide for a strip profile which gives the hose great flexibility, resistance to deformation resulting from radial crush, limited contraction upon exertion of vacuum and suction (negative pressures), and limited expansion upon application of internal (positive) pressures.

Another object of such a hose is to provide for such a strip profile which is low or thin in cross-section so that the hose will have a minimum wall thickness requiring the least amount of material, while preserving the desired hose characteristics of resistance to radial crush and to negative and positive pressures.

Another object is to provide for maximized bonding of extruded profile components.

Another object is to provide a precisely shaped flexible hose comprising at least one elongated strip helically wound into tubular form with one strip margin overlapping an adjacent margin at adjoining convolutions of the strip and with the strip being continuously secured and sealed at its overlapping margins by a bonding agent, in which the strip comprises a co-extrusion and the margins comprise reinforcing mating rib components precisely locating the bonding agent and having a material hardness which is higher than that of other portions of the strip for resisting any radially directed crush forces and contraction and expansion forces exerted on the hose.

Other aims and objects as well as a more complete understanding of the present invention will appear from the following explanation of exemplary embodiments and the accompanying drawings thereof.

BRIEF DESCRIPTION OF THE DRAWINGS

FIG. 2 depicts a cross-sectional view or profile of a strip of material formed in accordance with one embodiment of the present invention which, when helically wound and bonded together at its adjacent convolutions, forms the hose illustrated in partial cross-section in FIG. 2a;

FIG. 4 illustrates a further embodiment of the present invention whose strip profile is slightly modified from that shown in FIG. 3, with the profile of FIG. 4 being helically wound and joined at adjacent convolutions to form the hose shown in flexure in FIG. 4a;

DESCRIPTION OF THE PREFERRED EMBODIMENTS

Figure 1:
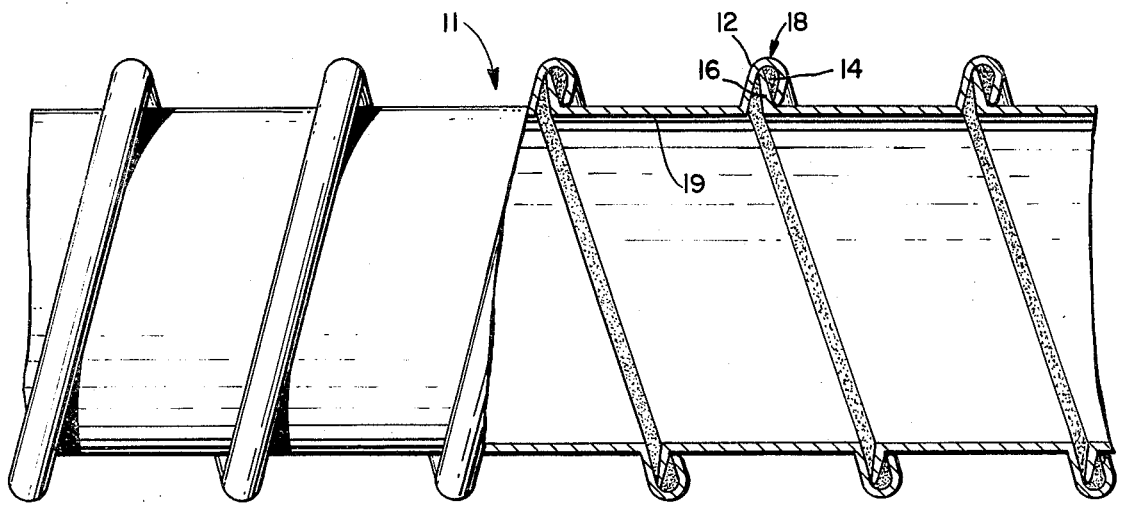
FIG. 1 is a side elevation of a prior art hose having a smooth interior surface.

As described above, FIG. 1 comprises prior art, to which reference has been made previously.

Figure 2:
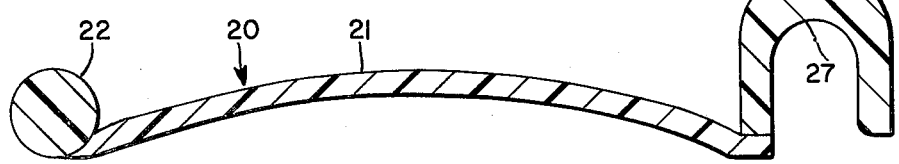
Figure 2A:
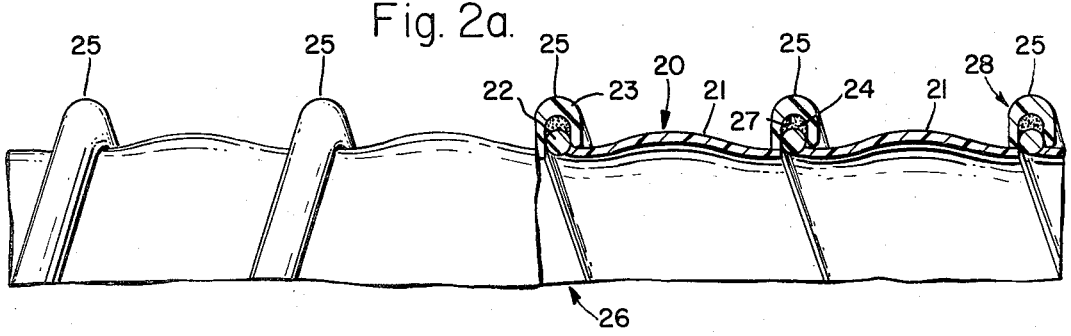

Accordingly, with reference to FIG. 2, a strip 20 is shown in cross-section as a co-extruded profile, comprising a thin web or membrane 21 and a pair of relatively thicker rib components 22 and 23. As shown in FIG. 2a, a length of strip 20 is helically coiled and is bonded by a bonding agent 24 at its helical convolutions 25 to form a hose 26. In this particular embodiment, component 22 is substantially circular in cross-section while component 23 has a U-shaped hook cross-section to permit the configuration of component 22 to substantially fit within cavity 27 defined by the U-shaped hook of component 23.

While bonding agent 24 is illustrated as completely contacting all surfaces of components 22 and 23, this preferred arrangement is not absolutely necessary and the bonding can be less than complete if the service of hose 26 and its use permits a lesser degree of bonding. It is to be understood that this philosophy is as applicable to all embodiments of the present invention as it is to FIGS. 2 and 2a.

Components 22 and 23, when convoluted and bonded together at adjacent convolutions 25, form a composite rib 28. In the practice of the present invention, rib components 22 and 23 are formed of a material or composition which provides them with a greater hardness than that of the material of web 21. As a consequence, composite rib 28, when bonded together and formed as a helix, is characterized by a high rigidity and a resistance to radial crush forces exerted on hose 26. Also, because of the relative stiffness and the solid construction of rib 28, the hose further resists axially imposed compressive forces arising from such negative pressures as established by internal vacuum. Thus, it limits contraction. The construction of the strip additionally limits expansion and elongation due to application of positive internal pressures.

It will be appreciated, of course, that web 21 (as well as all other webs of other embodiments hereof) is made as thin as possible also to enhance flexibility.

Furthermore, in this and all other embodiments of the present invention, various components of strip 20 comprise a co-extruded web 21 and rib components 22 and 23 which, as-formed, are bonded together to form an integral strip. It is preferred to form this co-extrusion from the component plastic materials in the same die before the material streams exit the die which, because of the great pressures exerted on the materials, more efficiently and securely integrates the whole.

In this respect, while it is believed that co-extrusion and the technique for effecting a co-extrusion is known in the art, to ensure completeness of the present disclosure, reference is made to a publication entitled "Plastics Technology Magazine" published by Rubber-/Automotive Division of Hartman Communications, Inc., a subsidiary of Bill Communications, Inc., 633 Third Avenue, New York, N.Y. 10017, which in Volume 22, No. 2, February 1976, pages 45–49 describes "Basic Co-extrusion Techniques". A copy of pages 45–49 and necessary identifying pages are enclosed herewith and made a part of the file wrapper hereof.

In the practice of the present invention, because the web, such as web 21, as thin and flexible, e.g., being about 0.020 to 0.040 inches (0.05 to 0.1 cm) in thickness and ⅛ inch (0.32 cm) in width, it is difficult to handle an extrusion thereof, especially with edges that are flaccid. Its flexibility and lack of rigidity is even more of a problem in the assembly of such a wispy web into a helically wound hose, notwithstanding the problem of lack of its resistance to radial crush, because of the great difficulties first in handling such a web when driving it through a winding head, second in bonding and interlocking its edges together when they have no rigidity, third in precisely locating bonding material between the edges, and fourth in maintaining the bond and edges from separating. In contrast to these problems encountered with the web due to its thin and flexible nature, more rigid and solid forms can be more easily extruded into more easily handled profiles whose shapes can also be maintained with greater precision. Such relatively more rigid shapes can also be handled with greater ease in hose forming machinery and be used to form crush resistant hose ribs. However, the required rigidity militates against hose flexibility.

The present invention not only has recognized the above features but has adapted these features to advantage in overcoming the problems inherent in the web. Specifically, since the web edges must be reinforced to avoid the above-noted handling and hose formation problems, the intended hose rib is divided into a pair of components which are respectively married to the web at its edges as a co-extrusion. Thus, the problem of flaccid and possibly ill-defined web edges is overcome. In addition, because the rib components can be made of a relatively stiff material, they greatly facilitate handling in the hose forming machinery. Also, they can be precisely shaped by extrusion into a form most conducive not only to enabling bonding material to be precisely placed between adjoining convolutions of themselves but also to forming an interlocked engagement also between themselves. The result, therefore, is a hose whose constituent parts are tailored to maximize flexibility and resistance to radially directed crush forces. In addition, such other advantages as resistance to internally exerted negative and positive pressures and minimizing hose wall thickness are designable into the co-extruded profile, as will become hereinafter clearer.

Figure 3:
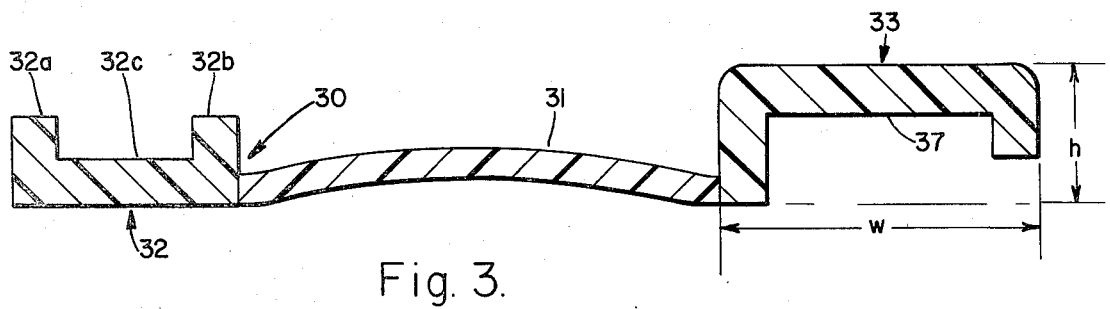
FIG. 3 shows another embodiment of the present invention comprising an improved profile over that shown in FIG. 2, allowing for a thinner overall wall thickness with good hoop strength and improved defined bonding area, with FIG. 3a being a partial cross-section of a hose formed from convolutions of the profile of FIG. 3.
Figure 3A:
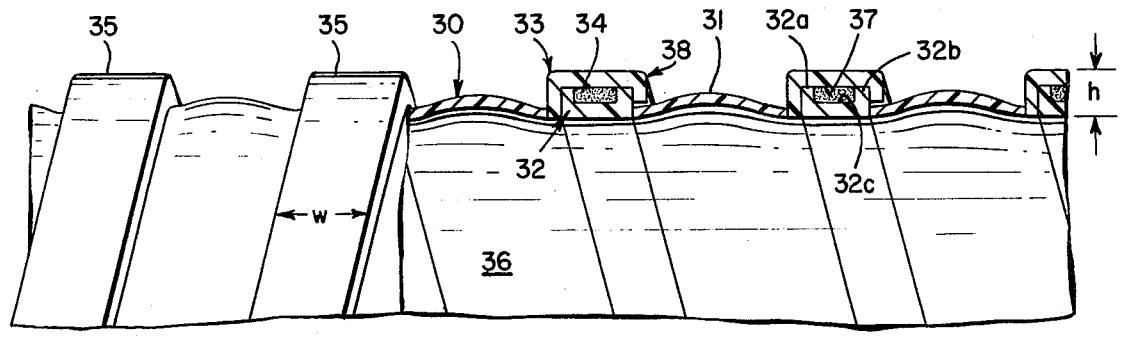

FIGS. 3 and 3a show a strip 30 having rib components 32 and 33, respectively having rectangular configurations, as distinguished from the rounded configurations of FIGS. 2 and 2a. The rectangular configuration of rib component 32 is provided with a pair of rails 32a and 32*b* forming therebetween a channel 32*c*. Rib component 33 is of generally rectangularly shaped hook configuration to provide an inner surface 37 into which component 32 fits. By virtue of channel 32*c*, a bonding agent 34 may be more easily and precisely located and deposited to insure adherence of the two rib components into a single rib 38. As before, components 32 and 33 are formed of a material whose hardness is considerably greater than that of web 31 so that, upon the joining together of the components at adjacent convolutions 35, resistance to radial crush is provided by the composite rib while flexing is permitted by web 31. The rectangular configuration of the rib components is conducive to defining a low profile of rib 38 to enable hose 36 to have the thinnest possible wall thickness with the least amount of material while preserving the other desired objects afforded by the invention. This low profile is preferably established by a narrow height h and a relatively wide width w so that the width is significantly greater than the height. It is to be understood, however, that the height and width dimensions may be adjusted as desired.

Figure 4:
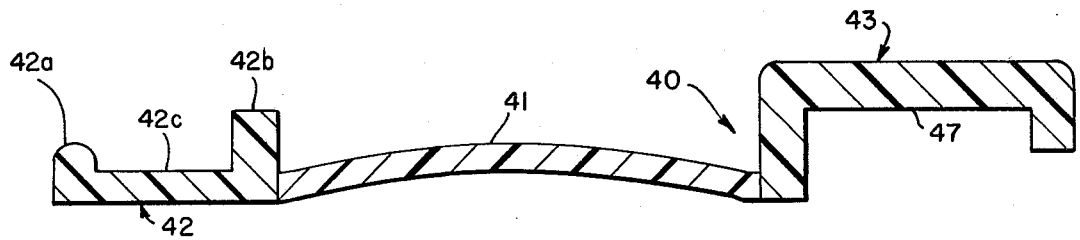
Figure 4A:
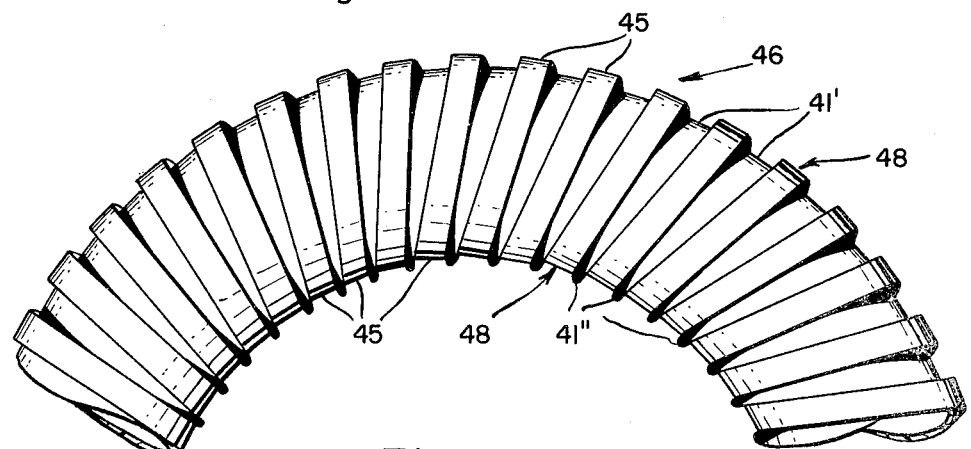

Referring now to FIGS. 4 and 4*a*, a strip 40 includes a web 41 and rib components 42 and 43 which are similar in configuration and numbering system as that of FIG. 3, with the exception that rail 42*a* is slightly less in height than rib 42*b* to provide for slightly more space for bonding by a bonding material or agent, similar to agent 34 of FIG. 3*a*. As shown in FIG. 4*a*, hose 46 is flexed, so that upper web portions 41' are in tension and lower web portions 41" are folded upon themselves to demonstrate the flexibility of the hose. Ribs 48 impart radial crush resistance and limit axial contraction, as before.

While the flexibility representation in FIG. 4*a* is demonstrated primarily with respect to the extruded profile of FIG. 4, it is to be understood that the illustration of FIG. 4 is as apropos to all embodiments of the present invention.

Figure 5:
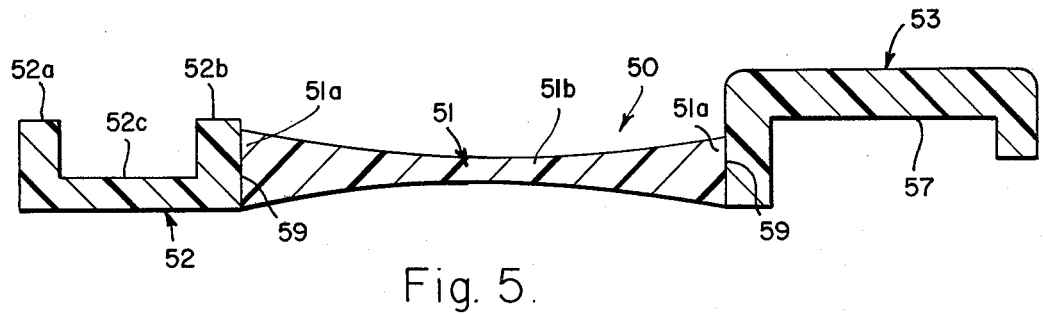
FIGS. 5 and 6 depict other profiles formed according to the teachings of the present invention and used to enhance adhesion between the several parts thereof, with FIG. 6 illustrating in phantom a partial section of an adjacent convolution of the strip bonded to its prior convolution.

In FIG. 5, web 51 is thickened at its ends 51*a* with respect to its middle 51*b* to increase the extent of its bonding surfaces 59 contacting with its rib components 52 and 53. In other respects, strip 50 is similar to that of the previous strips 20, 30, and 40.

Figure 6:
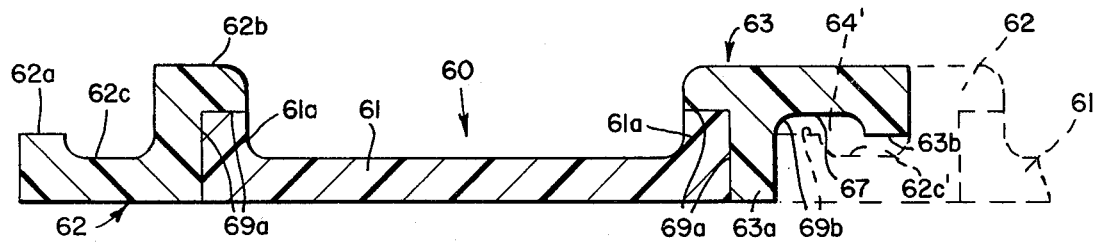

Referring to FIG. 6, still another configuration of the profile is shown as strip 60. Here, as compared to the embodiment of FIG. 5, even greater surface areas 69*a* and 69*b* on both web 61 at ends 61*a* and components 62 and 63 at their surfaces 62*a*, 62*b*, 62*c* and 63*a*, 63*b* and 67 are provided to increase further the amount of adhering or bonding area. In addition, a space 64' for receipt of bonding material is defined by a pair of mutually offset portions and is formed by cavity 67 and channel 62*c* respectively of rib components 63 and 62 when mated at adjacent convolutions. Space 64' enables bonding material 64 not only to join the adjacent convolutions but also to interlock them. Such a condition is of value, for example, when a bonding material of greater strength than the rib materials is needed. In other respects strip 60 is similar to the previously described strips.

Figure 7:
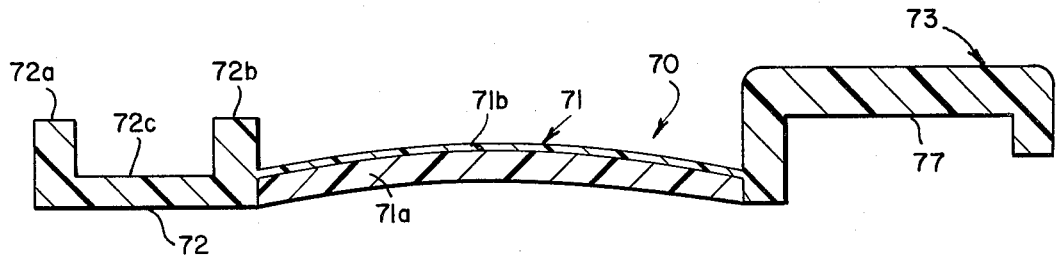
FIGS. 7–10 depict additional embodiments of the present invention whose profiles are configured as further composites of web structure as laminates and series connections of different materials, as well as a laminate of both the web and rib components.
Figure 8:
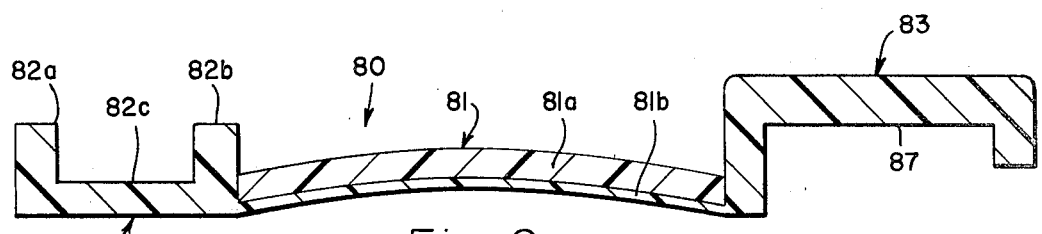

FIGS. 7 and 8 are similar and depict strips 70 and 80 respectively. In both configurations, rib components 72, 73 and 82, 83 are similar to those rib components shown before. Webs 71 and 81, however, are modified to provide laminates comprising materials 71*a* and 81*a* of different hardness respectively than materials 71*b* and 81*b*, for example, to alter the tear, puncture, temperature, etc. responses of the hose. In this configuration, materials 71*b* and 81*b* may be the same as their respective rib components 72, 73 and 82, 83. Thus, during the co-extrusion of profiles 70 and 80, there is a larger area provided for bonding or adhering of the molecular structures of the plastic materials, that is, not just at the rib components as shown in prior embodiments but also along the entire lengths of webs 70 or 80, defined as the contacting surfaces of portions 71*b* and 81*b*. The only difference between FIGS. 7 and 8 is that in FIG. 7 portion 71*b* is placed outwardly of web portion 71*a* while in FIG. 8 the reverse is true. The difference between the two configurations may be used, for example, if a particular plastic material is required for a particular use. Thus, if detrimental harm were to be exerted upon the hose from the outside, FIG. 7 would be used and, if from the inside, FIG. 8 would be preferred. Thus, the use of web parts 71*b* and 81*b* have twofold uses, as described above. In other respects, these embodiments are similar to that shown before.

Figure 9:
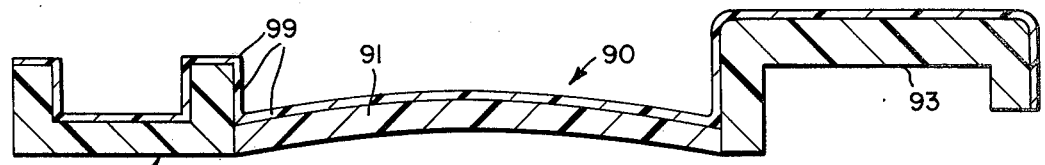

In FIG. 9, during co-extrusion a laminate 99 is provided over both rib components 92 and 93 as well as web 91, in order to extend the adhering surfaces of strip 90. Again, laminate 99 may be made of a special material suited to a particular environment and, accordingly, may be placed on the exterior of the profile as shown in FIG. 9 or fully on its interior or fully on both its interior and exterior.

Figure 10:
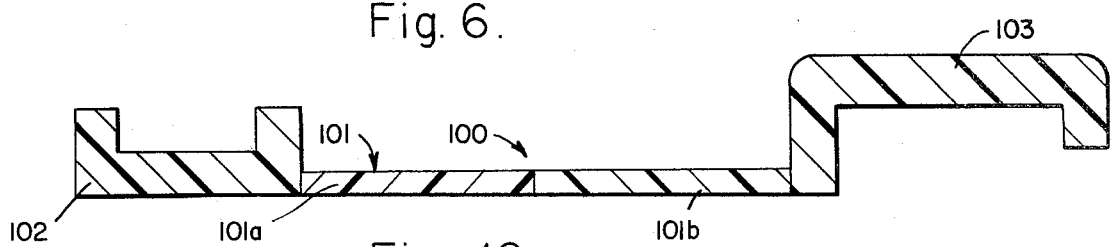

Referring now to FIG. 10, all components are similar as before with the exception of web 101 which forms a composite of series connected web portions 101*a* and 101*b*. This combination of web materials is generally preferred if it is desired that one portion be colored differently from the other portion, primarily for aesthetic purposes. Other uses may suggest themselves to the user as required. It is to be understood, of course, with respect to FIGS. 7–9, that different colors may also be utilized for the additional laminae 71*b*, 81*b* and 99. It is to be further understood that any of the rib components and webs of all FIGS. 1–10 may be colored differently, e.g., for aesthetic and/or coding purposes, or where color may enhance the environmental use of the hose, such as from heat or ultra-violet considerations.

In addition, two or more hoses having different diameters selected from any of the above embodiments, or combinations thereof amongst themselves or with other hoses, may be combined, one inside the other, for any desired purpose. For example, a vacuum cleaner hose is known (U.S. Pat. No. 3,965,526 entitled "Suction Hose With Conductor Means For Electric Current," which comprises one hose inserted within another hose between which an electrical cord extends for powering a power brush or other attachment at the floor end of the hose. Because some hoses of the present invention have a very low radial profile, e.g., those depicted in FIGS. 3*a* and 4*a*, resulting from the rectangular shaped ribs 38 and 48, it is possible to obtain an optional combination of maximum inner hose diameter and minimum outer hose diameter.

The materials of the various profiles or strips preferably comprise such plastics which include, by way of example and not of limitation, the polyethylenes, polypropylenes, polyvinyl chlorides, and combinations thereof, whose formulations may be varied or colored in accordance with end uses and environments for which the hose is intended, or in accordance with the desired combinations of material streams used to form the several co-extruded profiles. Thus, the co-extrusions and laminates can be formed from or be of differently formulated plastic materials.

Although the invention has been described with reference to particular embodiments thereof, it should be realized that various changes and modifications may be made therein without departing from the spirit and scope of the invention.

What is claimed is:

1. A strip for use in forming a flexible hose from helically wound convolutions of said strip comprising in unconvoluted cross-section:

a web component having opposed edges and two individual side components, each of which is continuously attached at the respective edges of said web component, each of said side components comprising material having hardness higher than that of at least a part of said web component for rendering both said side components with a relatively stiff and bend resistant characteristic and said web component with a relatively flexible characteristic.

2. A strip as in claim 1 wherein said two side components have means respectively for defining interfittable configurations for enabling a substantially mating interconnection between said two side components at adjacent convolutions of said strip.

3. A strip as in claim 2 wherein said interfittable configuration means respectively comprise a circular configuration and a generally U-shaped hook configuration.

4. A strip as in claim 2 wherein said interfittable configuration means comprise a generally rectangular configuration and a generally rectangular-shaped hook configuration.

5. A strip as in claim 4 wherein said generally rectangular configuration means further includes a channel for receiving a bonding agent therein.

6. A strip as in claim 1 wherein said web component comprises a membrane which is significantly thinner than said side components to enhance the relative stiff and flexible characteristics respectively of said side components and said web component.

7. A strip as in claim 1 wherein said web component and said side components comprise a co-extruded integral article of manufacture.

8. A strip as in claim 7 wherein said side components and said web component respectively comprise differently formulated plastic materials.

9. A strip as in claim 7 wherein the said web component comprises a co-extrusion of differently formulated plastic materials.

10. A strip as in claim 9 wherein said web component co-extrusion comprises a series connection of at least the two differently formulated plastic materials extending between said two side components.

11. A strip as in claim 9 wherein said web component co-extrusion comprises a laminate of at least the two differently formulated plastic materials extending in parallel between said two side components.

12. A strip as in claim 11 wherein said side components comprise material which is the same material as one of said plastic materials of said web component.

13. A strip as in claim 12 wherein said differently formulated materials have compatible molecular structures for enabling interfacial bonds and adhesion to and between all contacting surfaces of said side components and said web component.

14. A strip as in claim 13 wherein said differently formulated materials are selected from the group of plastics consisting of the polyethylenes, polypropylenes, polyvinyl chlorides, and mixtures thereof.

15. A flexible hose comprising at least one elongated strip helically wound into tubular form with one strip margin overlapping an adjacent margin at adjoining convolutions of said strip and with said strip being continuously bonded and sealed at its overlapping margins, characterized in that said strip comprises a co-extrusion and each of said bonded and sealed margins has a material hardness which is higher than that of at least one other portion of said strip for resisting any radially directed crush forces exerted on the hose.

16. A flexible hose as in claim 15 further characterized in that said margins comprise components matable with one another which, when bonded and sealed together at the adjoining convolutions, define a helically extending interlocked rib, said rib being relatively stiff with respect to said other portion of said strip.

17. A flexible hose as in claim 16 further characterized in that said strip includes means for defining a web interconnecting said matable rib components, said web means being substantially more flexible relative to said rib.

18. A flexible hose as in claim 17 further characterized in that said co-extrusion comprises said web means and said matable rib components, and that said co-extrusion comprises differently formulated plastic materials.

19. A flexible hose as in claim 18 further characterized in that said plastic materials are differently colored for coding and imparting an aesthetically pleasing appearance to said hose.

20. A flexible hose as in claim 18 further characterized in that said co-extrusion includes a laminate in which one of said plastic materials is selected to protect the hose from deleterious environmental conditions for which the hose is intended.

21. A flexible hose as in claim 18 further characterized in that said web means comprises a co-extrusion of differently formulated plastic materials.

22. A flexible hose as in claim 21 further characterized in that said web means co-extrusion comprises a series connection of said differently formulated plastic materials.

23. A flexible hose as in claim 21 further characterized in that said web means co-extrusion comprises a laminate of said differently formulated plastic materials.

24. A flexible hose as in claim 23 further characterized in that one of said differently formulated plastic materials comprising said laminate is the same as that of said matable rib components.

25. A flexible hose as in claim 18 further characterized in that a further plastic material is included in said co-extrusion and extends in bonded adhesion to both said web means and said matable rib components.

26. A flexible hose as in claim 16 further characterized in that said matable rib components respectively comprise means for defining a generally circular configuration and a generally U-shaped hook configuration, said U-shaped hook configuration means extending over and around and bonded and sealed to said circular configuration means at the adjoining convolutions.

27. A flexible hose as in claim 16, further characterized in that said matable rib components respectively comprise means for defining a generally rectangular configuration and a generally rectangular shaped hook configuration, said rectangular-shaped hook configuration means extending over and around and bonded and sealed to said rectangular configuration means at the adjoining convolutions.

28. A flexible hose as in claim 27 further characterized in that said rib, formed from said rib components, includes means for defining its cross-section dimensions with a width greater than its height, thereby for imparting said strip with a low profile and said hose with a thin wall.

29. A flexible hose as in claim 27 further characterized in that said generally rectangular configuration means includes means for defining a channel therein for receiving and precisely locating therein means for defining an agent for continuously bonding and sealing said matable rib components together at the adjoining convolutions.

30. A flexible hose as in claim 29 further characterized in that said channel means and said rectangular-shaped hook configuration define a space with a pair of mutually offset portions for enabling said bonding agent not only to bond and seal said matable rib components together but also to act as an interlock therebetween.

31. A flexible hose as in claim 29 further characterized in that said channel means comprises a pair of radially extending rails continuously extending along the length of said matable rib component having said rectangular configuration means.

32. A flexible hose as in claim 31 further characterized in that said rails are of substantially the same height.

33. A flexible hose as in claim 31 further characterized in that one of said rails is higher than the other of said rails for increasing the volume for said bonding agent means.

34. A flexible hose comprising an elongated strip helically wound into tubular form with one strip margin secured to an adjacent margin at adjoining convolutions of said strip, characterized in that:
  said strip comprises a co-extrusion of at least two structural components;
  each of said margins has a material hardness higher than that of another part of said strip; and
  said margins are bonded and sealed together at the adjoining convolutions to form a helically extending interlocked rib, said rib being relatively stiff with respect to said other part of said strip.

35. A flexible hose comprising at least one elongated strip helically wound into tubular form with one strip margin secured to an adjacent margin at adjoining convolutions of said strip, characterized in that each of said secured together margins has a material hardness which is higher than that of at least one other portion of said strip for resisting any radially directed crush forces exerted on the hose.

36. A flexible hose as in claim 35 further characterized in that said margins comprise individual components each of which has and which are bonded and sealed together at the adjoining convolutions to form a helically extending interlocked rib, said rib being relatively stiff with respect to said other portion of said strip.

* * * * *